United States Patent
Ammer et al.

(10) Patent No.: US 7,463,702 B2
(45) Date of Patent: Dec. 9, 2008

(54) SYSTEM AND METHOD FOR ONE-PASS BLIND TRANSPORT FORMAT DETECTION

(75) Inventors: Gerhard Ammer, Munich (DE); William H. Smith, III, Bethlehem, PA (US); Shuzhan Xu, Coplay, PA (US)

(73) Assignee: Agere Systems Inc., Allentown, PA (US)

( * ) Notice: Subject to any disclaimer, the term of this patent is extended or adjusted under 35 U.S.C. 154(b) by 540 days.

(21) Appl. No.: 10/292,268

(22) Filed: Nov. 12, 2002

(65) Prior Publication Data

US 2004/0091067 A1 May 13, 2004

(51) Int. Cl.
*H04L 27/06* (2006.01)
(52) U.S. Cl. .......... 375/341; 375/224; 375/225; 375/262; 375/287; 375/365; 375/354; 714/52
(58) Field of Classification Search .......... 375/341, 375/147, 130, 377, 340, 279, 281, 329, 332, 375/261, 362, 265, 365, 368, 354, 262, 287, 375/224–225, 228, 280; 329/304; 714/786, 714/794, 795, 796, 752, 701, 48, 52, 758, 714/776, 792; 370/252
See application file for complete search history.

(56) References Cited

U.S. PATENT DOCUMENTS

| | | | |
|---|---|---|---|
| 5,928,378 A * | 7/1999 | Choi | 714/795 |
| 6,765,887 B1 * | 7/2004 | Shiu et al. | 370/329 |
| 6,885,701 B2 * | 4/2005 | Kuwazoe | 375/225 |
| 7,024,602 B2 * | 4/2006 | Obuchi et al. | 714/712 |
| 7,072,926 B2 * | 7/2006 | Nagata et al. | 708/277 |
| 7,184,409 B2 * | 2/2007 | Lee et al. | 370/252 |
| 7,228,491 B2 * | 6/2007 | Oki | 714/794 |
| 2003/0007580 A1 * | 1/2003 | Nagata et al. | 375/341 |
| 2003/0108011 A1 * | 6/2003 | Lee et al. | 370/335 |

OTHER PUBLICATIONS

Insoo Sohn, Seoyoung Lee "Blind Rate Detection Algorithm in WCDMA Mobile Receiver", IEEE 2001.*

* cited by examiner

*Primary Examiner*—Mohammad H Ghayour
*Assistant Examiner*—Sophia Vlahos (57) ABSTRACT

For use in a CDMA receiver having a Viterbi decoder, a system for, and method of, performing one-pass blind transport format detection (BTFD) with respect to a received frame and a WCDMA receiver incorporating the system or the method. In one embodiment, the system includes: (1) a traceback circuit that performs a zero state BTFD traceback function with respect to at least a Viterbi-decoded portion of the frame, the traceback function being dependent upon a relative position of a BTFD checkpoint and generating hard decision bits and (2) a BTFD point selection circuit, coupled to the traceback circuit, that employs the hard decision bits to determine a location of a BTFD point with respect to the frame.

21 Claims, 8 Drawing Sheets

SYSTEM AND METHOD FOR ONE-PASS BLIND TRANSPORT FORMAT DETECTION

TECHNICAL FIELD OF THE INVENTION

The present invention is directed, in general, to code-division multiple access (CDMA) communication systems and, more specifically, to a system and method for one-pass blind transport format detection (BTFD) for use in a CDMA receiver.

BACKGROUND OF THE INVENTION

Wireless communication is playing an evermore important role in today's world. More people are signing up for wireless service, and they are expecting their wireless terminals (e.g., pagers, phones, faxes and computers) to perform more functions more rapidly and efficiently than ever before.

As wireless terminals and their associated networks grow in size and complexity, communication standards that give rise to interoperability among various manufacturers' systems become vital. Standards bodies are responding by designing new wireless networks, protocols and terminal features in a multinational effort called "3G," which is short for "third generation wireless information technology."

One standard that is garnering much attention these days is the "Universal Mobile Telecommunications System" standard, or UMTS. UMTS calls for the use of WCDMA (which stands for Wideband Code-Division Multiple Access) as its radio interface technology. WCDMA is the preferred technology, because its 5 Mhz carrier bandwidth can accommodate very high data communication speeds and therefore the speed, flexibility and features that people are beginning to demand.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-D Recommended Minimum Standard for Dual-Mode Wideband Spread Spectrum Cellular Mobile Station" (the IS-98 standard), (3) the standard offered by a consortium named "$3^{rd}$ Generation Partnership Project" (3GPP) and embodied in a set of documents including Document Nos. 3G TS 25.211, 3G TS 25.212, 3G TS 25.213 and 3G TS 25.214 (the WCDMA standard) and (4) the standard offered by a consortium named "$3^{rd}$ Generation Partnership Project 2" (3GPP2) and embodied in a set of documents that includes Nos. C.S0002-A, C.S0005-A, C.S0010-A, C.S0011-A, C.S0024 and C.S0026 (the CDMA2000 standard). These standards are incorporated herein by reference.

WCDMA can support more than one overlying transport format. In fact, UMTS currently supports 16 such transport formats for WCDMA. Each format calls for bits of information transmitted between stations to be gathered into frames and given Cyclic Redundancy Check (CRC) bits to ensure their integrity. However, the similarity between the various transport formats ends there. For a UMTS-compliant receiver to be able to interpret frames received from a UMTS-compliant transmitter, the receiver must come to know which one of the 16 possible transport formats the transmitter used to format the frames.

Two ways exist for the receiver to gain such knowledge under the current UMTS standard. As a first alternative, the transmitter could expressly instruct the receiver as to which transport format it is using. UMTS accommodates an optional Transport Format Indicator (TFI) for just this purpose. As a second alternative, the receiver could determine the transport format for itself by, for example, looking for valid CRC bits in the frames. This process is called Blind Transport Format Detection, or BTFD.

The apparent advantage in the first alternative is that the receiver's time and effort (which translates to energy consumption) are saved. However, bandwidth which could otherwise be used to carry user data is instead forced to carry TFIs. BTFD allows that bandwidth to be preserved for carrying user data, but obviously imposes processing effort and concomitant energy consumption on the receiver.

Before venturing into a specific description of the nature of the processing effort, one technical detail should be discussed. WCDMA receivers do not directly receive bits from WCDMA transmitters. Instead, WCDMA receivers receive symbols; each symbol conventionally represents more than one bit in a given frame. Once received, the symbols are decoded, often in a circuit called a "Viterbi decoder." A Viterbi decoder decodes convolutionally encoded bits using the Viterbi algorithm and is known to those skilled in the art.

Currently, BTFD is carried out by first allowing the Viterbi decoder to decode received symbols into bits. A frame's worth of bits generated by the Viterbi decoder is then collected and stored in a buffer. Then, a software-based iterative process is initiated, whereby the frame is tested under each possible transport format until valid CRC bits are found. In the UMTS standard, which accommodates 16 possible transport formats, one would expect the process to have to be repeated eight times on average before finding the valid CRC bits.

This iterative process obviously consumes time, processing resources and battery life. Because it is inherently slow, BTFD is only used with relatively low rate channels (typically voice channels). In the case of high rate channels (typically data channels), TFIs must be transmitted (at the loss of some bandwidth).

Accordingly, what is needed in the art is a faster, less power consumptive way of carrying out BTFD in a receiver so high rate channels can be accommodated without requiring the transmission of bandwidth-reducing TFIs.

SUMMARY OF THE INVENTION

To address the above-discussed deficiencies of the prior art, the present invention provides, for use in a CDMA receiver having a Viterbi decoder, a system for, and method of, performing one-pass BTFD with respect to a received frame and a WCDMA receiver incorporating the system or the method. In one embodiment, the system includes: (1) a traceback circuit that performs a zero state BTFD traceback function with respect to at least a Viterbi-decoded portion of the frame, the traceback function being dependent upon a relative position of a BTFD checkpoint and generating hard decision bits and (2) a BTFD point selection circuit, coupled to the traceback circuit, that employs the hard decision bits to determine a location of a BTFD point with respect to the frame.

The present invention therefore introduces the broad concept of performing BTFD in parallel with Viterbi decoding, thereby significantly decreasing the time and effort required to perform BTFD. This not only allows BTFD to be performed with respect to high rate channels, but also allows BTFD to be performed on channels of any rate more power-efficiently.

In one embodiment of the present invention, the BTFD checkpoint is positioned: (1) at a traceback point, (2) within a traceback window or (3) at an end of the frame. Three subalgorithms will be set forth in the Detailed Description that correspond to the three positions set forth above.

In one embodiment of the present invention, the at least the Viterbi-decoded portion is two blocks of the frame. In an embodiment to be illustrated and described, the two blocks are current and next blocks.

In one embodiment of the present invention, the BTFD point selection circuit determines the BTFD point to be a BTFD checkpoint having a maximum threshold. This process will be set forth in greater detail in the detailed description that follows.

In one embodiment of the present invention, the traceback circuit performs the traceback function while the at least the Viterbi-decoded portion of the frame is stored in a buffer. In a related embodiment, the BTFD point selection circuit determines the location of the BTFD point with respect to the frame while the hard decision bits are stored in a buffer. These and other implementation-specific details will be described hereinafter.

In one embodiment of the present invention, the traceback circuit and the BTFD point selection circuit are integral to the Viterbi decoder. Alternatively, the traceback circuit and the BTFD point selection circuit may be associated with circuitry adjacent to the Viterbi decoder.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
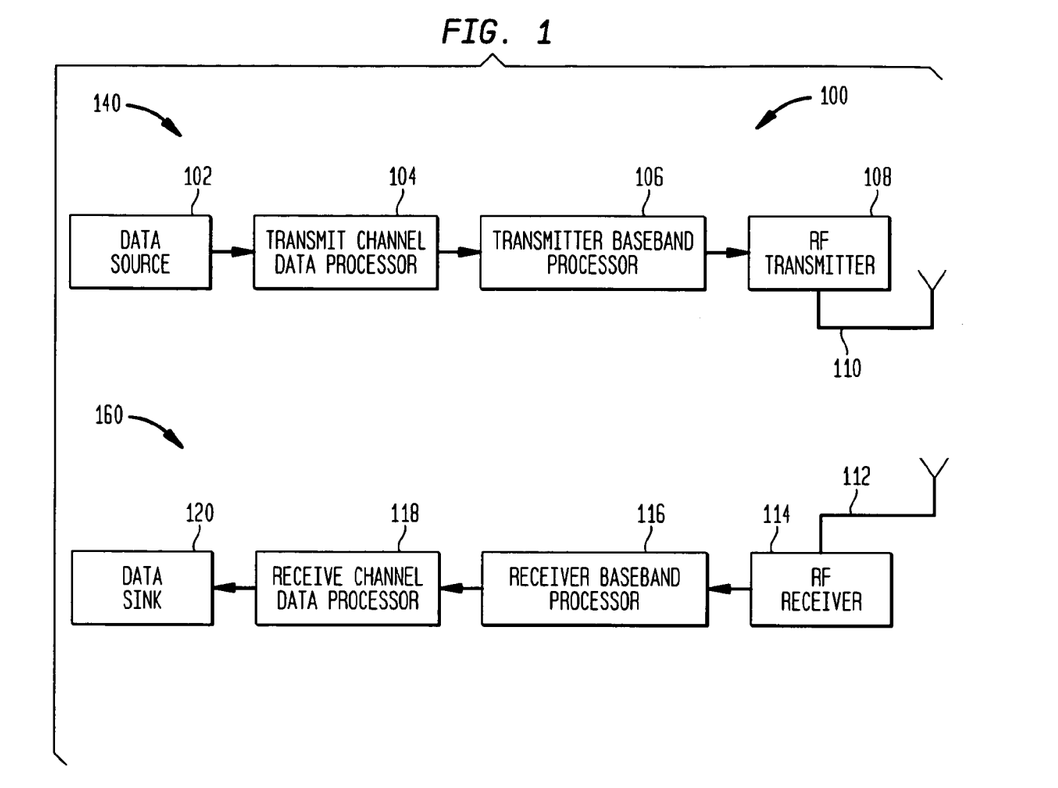
FIG. 1 illustrates a block diagram of a WCDMA-compliant transmitter and receiver, the receiver incorporating a system or method constructed or carried out according to the principles of the present invention.

Referring initially to FIG. 1, illustrated is a block diagram of a WCDMA-compliant transmitter and receiver, generally designated 100. The receiver incorporates a system or a method constructed or carried out according to the principles of the present invention.

The communications system 100 includes a transmit unit 140 and a receive unit 160. The transmit unit 140 includes a data source 102, a transmit channel data processor 104, a transmitter baseband processor 106, an RF transmitter 108 and an antenna 110. The receive unit 160 includes an antenna 112, an RF receiver 114, a receiver baseband processor 116, a receive channel data processor 118 and a data sink 120. Note that, while FIG. 1 illustrates but single-element transmit and receive antennas, certain applications of the present invention may advantageously call for multiple-element transmit and receive antennas.

Data is sent from data source 102 in blocks to the transmit channel data processor 104. The transmit channel data processor 104 formats, codes and processes the data to produce one or more analog signals to be transmit. The transmit channel data processor 104 further converts the data from digital to analog form. The transmitter baseband processor 106 takes the analog signals and quadrature modulates, filters, amplifies and converts the frequency of the analog signals to radio frequency (RF). The modulated RF signals, sequences of WCDMA symbols, are transmit by the antenna 110.

At the receiver unit 160, the transmitted signal is received by the antenna 112. The RF signals are then downcoverted to an intermediate or baseband frequency, filtered and quadrature demodulated by the receiver baseband processor 116. The receiver baseband processor 116 also performs analog-to-digital conversion of the received signals. The digital samples are then processed by the receive channel data processor 118, which decodes and processes the samples to recover the transmitted data. The processing performed by the receive channel data processor 118 is a set of receiver functions that reverse the specific operations performed by the transport channel data processor 104. The recovered data is passed to the data sink 120.

Figure 2:
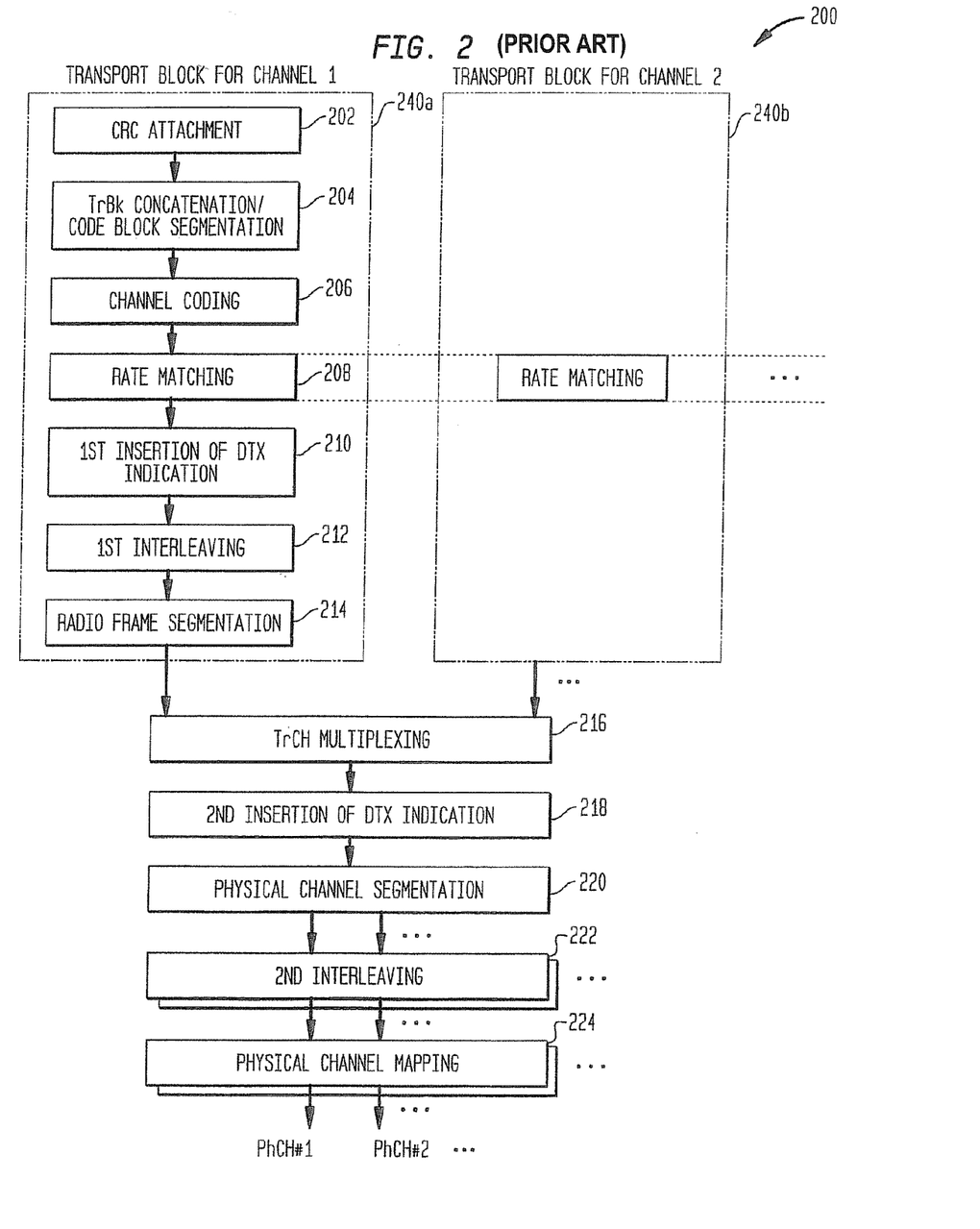
FIG. 2 illustrates a diagram showing the coding, multiplexing and processing performed by the transmit unit for downlink data transmission in accordance with the WCDMA standard.

Turning now to FIG. 2, illustrated is a diagram, generally designated 200, showing the coding, multiplexing and processing performed by the transmit unit 140 for downlink data transmission in accordance with the WCDMA standard. "Downlink" refers to transmission from a base station to a user terminal. "Uplink" refers to transmission from the user equipment to the base station. The coding, multiplexing and processing blocks shown in FIG. 2 are generally performed by the transmit channel data processor 104 shown in FIG. 1. As previously described, UMTS currently supports 16 transport formats for WCDMA.

Data to be transmitted arrives at the transmit channel data processor 104 as blocks of data, also called "transport blocks," at specified transmission time intervals (TTI). The TTI is transport channel specific, and can be one of the following intervals: 10 ms, 20 ms, 40 ms or 80 ms. Other portions of the WCDMA system support concurrent transmission of multiple transport channels.

Each transport channel block 240 performs substantially the same processing steps. The entire transport block is used to calculate CRC parity bits and attach them (a step 202) to the end of the transport block. The CRC parity bits are used for error detection. Transport blocks with the CRC attachments are serially concatenated. If the number of bits in a TTI is larger than the maximum size of the code block, the code block is segmented into a number of equal-sized code blocks (a step 204). The maximum size of the code block depends upon the type of coding used for the particular transport channel. Coding schemes supported by the WCDMA standard are convolutional coding, turbo coding and no coding. In a step 206, each of the code blocks is coded using one of the supported coding schemes. In the illustrated embodiment, a convolutional code is used.

Rate matching is performed in a step 208. Rate matching means that bits on a transport channel are repeated or removed (punctured). On uplink, bits are repeated or punctured in order to match the number of bits to be transmit to the number of bits available. On downlink, unused bit positions are filled by insertion of discontinuous transmission (DTX) indication bits in a step 210. The DTX indication bits are not actually transmitted; the DTX indication bits identify when transmission should be turned off.

In a step 212, the bits are interleaved in order to reduce the noise sensitivity of the data. The particular way in which the bits are interleaved is pre-determined and defined in the WCDMA standard. The interleaving time interval is also known as the transmission time interval (TTI).

If the TTI for the specific transport channel is greater than 10 ms, the bits to transport are segmented and mapped onto consecutive transport channel radio frames in a step 214. Each transport channel radio frame corresponds to a 10 ms radio frame period. As the TTI can be either 10 ms, 20 ms, 40 ms or 80 ms as defined in the WCDMA standard, the transport channel traffic may be interleaved over 1, 2, 4 or 8 radio frame periods.

A step 216 calls for the radio frames from all transport channels to be serially multiplexed into a coded composite transport channel CCTrCH. More DTX indication bits may be inserted (in a step 218) to make the number of bits to be transmitted match the number of bits available. If multiple physical channels are to be used, the bits are segmented into separate physical channels in a step 220. A physical channel can carry transport channels that have different TTIs.

A second interleaving of bits in each radio frame for each physical channel occurs in a step 222. The interleaving allows for greater time diversity and reduced noise sensitivity. Finally, a step 224 calls for the interleaved radio frames to be mapped to their respective physical channels for transmission.

Figure 3:
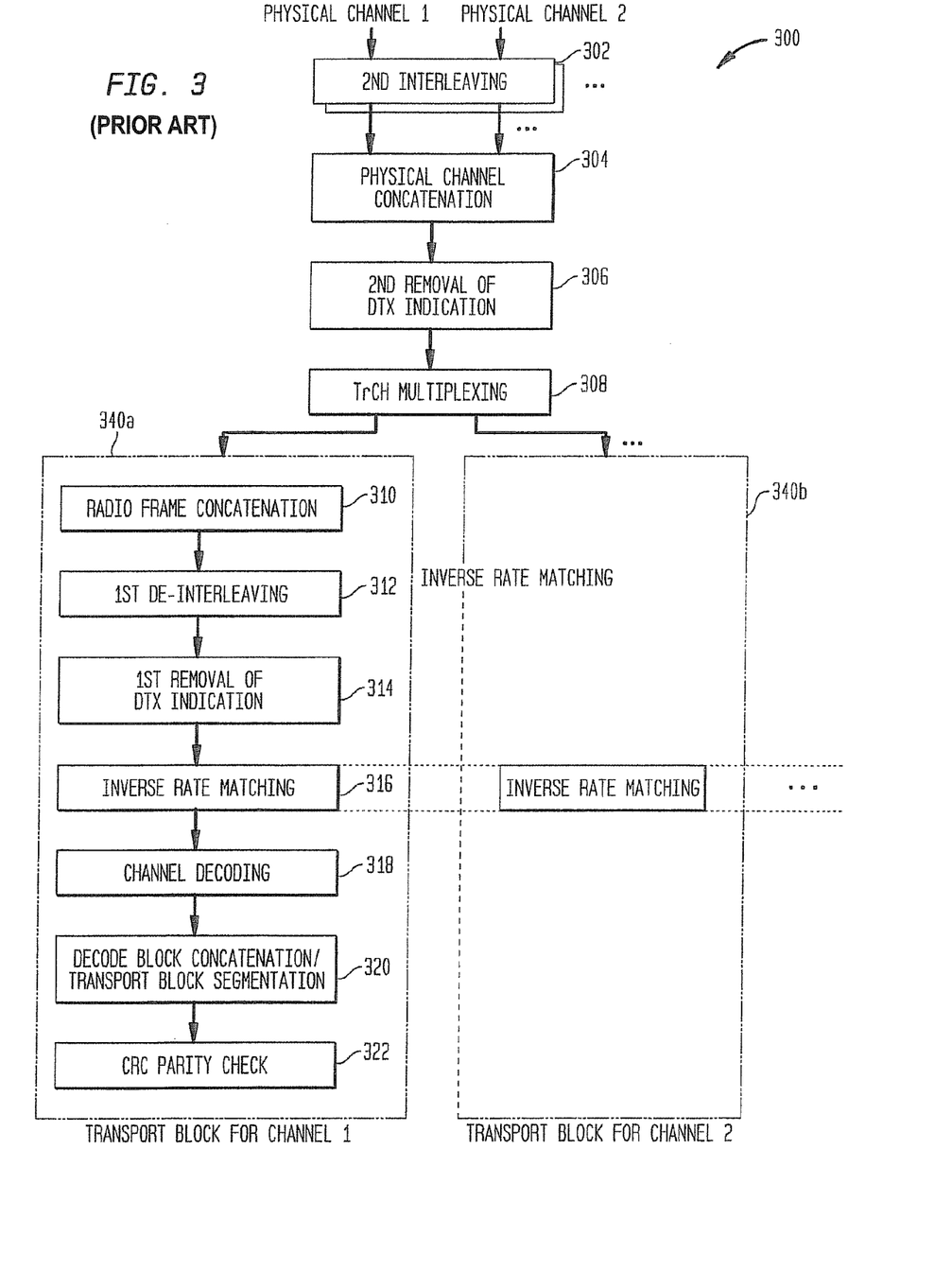
FIG. 3 illustrates a diagram showing the processing, de-multiplexing and decoding performed by the receiver unit for downlink data transmission in accordance with the WCDMA standard.

Turning now to FIG. 3, illustrated is a diagram, generally designated 300, showing the processing, de-multiplexing and decoding performed by the receiver unit 160 for downlink data transmission in accordance with the WCDMA standard. The processing in the block diagram 300, performed by the receive channel data processor 118 shown in FIG. 1, is a complementary set of receiver functions that reverse the specific operations performed by the transmit channel data processor 104 and described in detail in FIG. 2. The modulated signal is received, processed and digitized by the receiver baseband processor 116 shown in FIG. 1. The receiver baseband processor 116 passes the symbols for each physical channel used for data transmission to the receive channel data processor 118.

Each symbol corresponds to a transmitted bit or group of bits. In a step 302, the symbols from each physical channel are de-interleaved. The symbols are then serially concatenated in a step 304. For a downlink transmission, all DTX indicator bits are detected and removed in a step 306. Then, in a step 308, the symbols are de-multiplexed into different transport channels. The radio frames for each transport channel are provided to their respective transport channel processing sections 340.

In each transport channel processing section 340, the radio frames are serially concatenated in a step 310. Each channel may contain one or more transport channel radio frames and corresponds to the TTI used at the transmitter. In a step 312, the symbols are de-interleaved and DTX indication bits are identified and removed in a step 314. In a step 316, inverse rate matching to accumulate repeated symbols and insertion of "don't cares" for deleted symbols is performed.

In a step 318, the channel decoder decodes each coded block in the transport channel. The decoded blocks are concatenated and segmented in a step 320 into their respective transport blocks. The CRC parity check is performed in a step 322 on each transport block.

Figure 4:
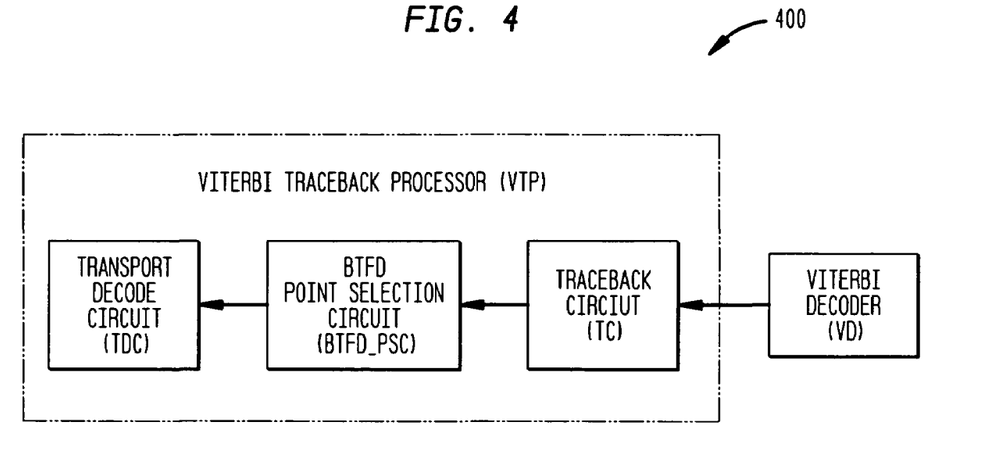
FIG. 4 illustrates a block diagram of a channel decoder constructed in accordance with the principles of the present invention.

Turning now to FIG. 4, illustrated is a block diagram of a channel decoder, generally designated 400, constructed in accordance with the principles of the present invention. The channel decoder 400 is an embodiment of the channel decoder function described in step 318 of FIG. 3. Channel decoder 400 is part of the receiver path of a WCDMA compliant transmitter and receiver and incorporates a system or method constructed or carried out according to the principles of the invention.

The channel decoder 400 includes a Viterbi decoder VD, a traceback circuit TC, a BTFD point selection circuit BTFD_PSC and a transport decode circuit TDC. The Viterbi decoder VD decodes the sequence of WCDMA symbols into a frame. As described above, BTFD is used to determine the transport format used. BTFD schemes are search processes that look for valid CRC bits in the frames to identify the overlying transport format. While the UMTS WCDMA standard specifies quite complicated transport, multiplexing, channel coding and channel structures, in the illustrated embodiment, the following constraints are applied: (1) only one coded composite transport channel (CCTrCH) is received; (2) the number of CCTrCH bits per radio frame is 600 or less; (3) the number of transport format combinations of the CCTrCH is 64 or less; (4) fixed positions of the transport channels are used on the CCTrCH to be detectable; (5) convolutional coding is used on all explicitly detected TrCHs; (6) CRC with non-zero length is appended to transport blocks on all explicitly detected TrCHs; (7) at least one transport block shall be transmitted per TTI on each explicitly detectable TrCH; (8) the number of explicitly detectable TrCHs is 3 or less; (9) for all explicitly detectable TrCHs i, the number of code blocks in one TTI ($C_1$) shall not exceed 1; (10) the sum of the transport format set sizes of all explicitly detected TrCHs is 16 or less; and (11) at least one TrCH can be used as the guiding transport channel for all transport channels using guided detection.

The traceback circuit TC, associated with Viterbi decoder VD, performs a zero state BTFD traceback function with respect to at least a Viterbi-decoded portion of the frame. The traceback function is dependent upon a relative position of a BTFD checkpoint. The traceback function generates hard decision bits.

The BTFD point selection circuit BTFD_PSC, associated with the Viterbi decoder VD, employs hard decision bits to determine a location of a BTFD point with respect to the frame. The transport decode circuit TDC, coupled to the BTFD point selection circuit BTFD_PSC, employs the BTFD point to extract user bits from the frame.

Figure 5:
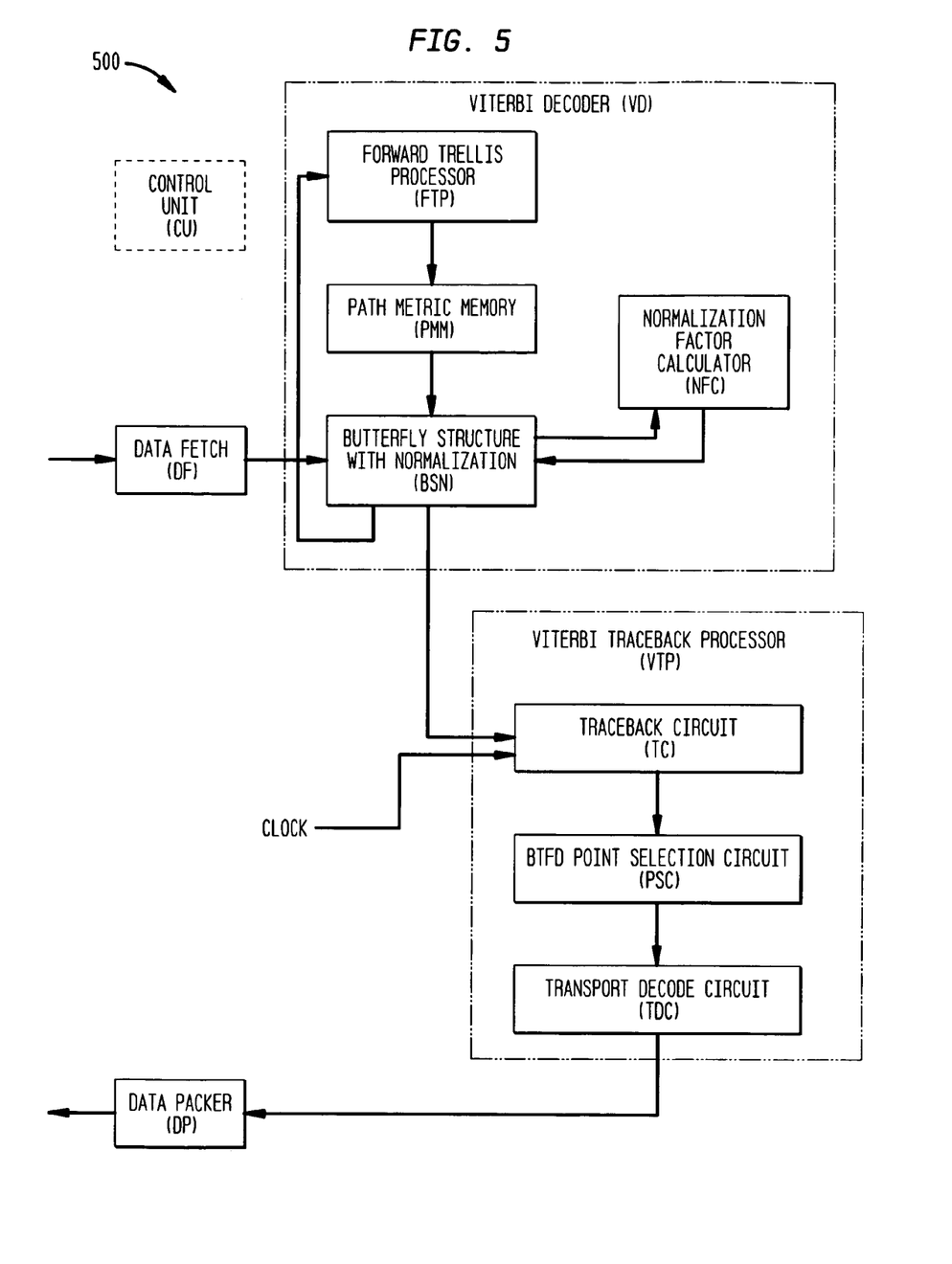
FIG. 5 illustrates a block diagram of an embodiment of a Viterbi decoding engine constructed in accordance with the principles of the present invention.

Turning now to FIG. 5, illustrated is a block diagram of an embodiment of a Viterbi decoding engine, generally designated 500, constructed in accordance with the principles of the present invention. The Viterbi decoding engine includes a data fetch (DF), a forward trellis processor (FTP), a path metric memory (PMM), a butterfly structure with normalization (BSN), a normalization factor calculator (NFC), a Viterbi traceback processor (VTP) and a data packer (DP).

The DF passes the received frames of data to the BSN for normal Viterbi decoding. The calculated path metric values for Viterbi decoding are stored in the PMM. In one embodiment of the invention, the Path Metric Memory PMM contains eight banks of memory, each bank storing a number of path metric values depending on the code constraint. The path metric values are read out, normalized and presented to the BSN. The BSN calculates new path metric values and passes them to the FTP. The BSN also calculates decision bits, which are aggregated into bytes and written to the TC. The winning state, corresponding to the maximum path metric, for each trellis row is delivered to the VTP. The winning state for each trellis row becomes the starting point for the traceback process.

The VTP includes a Traceback Circuit (TC), a BTFD Point Selection Circuit (BTFD_PSC) and a Transport Decode Circuit (TDC). The TC performs the traceback function while the at least Viterbi decoded portion of the frame is stored in a buffer. The TC receives input from the BSN of the winning state for each trellis row as well as a clock signal input. The TC examines each trellis row to determine the largest value to be used as a starting point from zero state, no matter what the last winning state is. In one embodiment of the present invention, the TC and the BTFD_PSC are integral to the Viterbi decoder. Alternatively, the TC and the BTFD_PSC may be associated with circuitry adjacent to the Viterbi decoder.

Correlation is used as a path metric in one embodiment of the invention, and the overall BTFD search criterion are:

$$s(n_{end}) = 10\log_{10}\frac{a_0(n_{end}) - a_{\min}(n_{end})}{a_{\max}(n_{end}) - a_{\min}(n_{end})} \text{ and the } CRC,$$

where $a_{max}(n_{end})$, $a_{min}(n_{end})$, and $a_0(n_{end})$ are three path metrics (max, min and zero-state) at a checkpoint $n_{end}$. A correct BTFD point may be declared only if $S(n_{end}) \leq D$ and the CRC test passes. The final conclusion on the transport format is the point with minimum $S(n_{end}) \leq D$ and a pass of the CRC test.

For $S(n_{end}) \leq D$, it follows that $$\{a_0(n_{end}) - a_{\min}(n_{end})\} \leq 10^{\frac{D}{10}}\{a_{\max}(n_{end}) - a_{\min}(n_{end})\}. \text{ Let } D^* = 10^{\frac{D}{10}},$$

then check only whether the threshold is positive. The valid points are those with Threshold($n_{end}$)$\geq$0, and the final winner is the point with the largest Threshold($n_{end}$); that is, $n_{win}$=arg max$_{n_{end}}$\{Threshold($n_{end}$)\}.

Note that $$D^* = 10^{\frac{D}{10}}$$

should be programmed after system calibration based upon performance evaluation.

The BTFD_PSC performs the CRC test, threshold calculations and comparisons and sets hard decision bits for BTFD. Then the BTFD_PSC determines the location of the BTFD point with respect to the frame while the hard decision bits are stored in a buffer. In one embodiment of the invention, the BTFD may be an integral part of the Viterbi decoder. For traceback memory saving, the Viterbi decoder can be implemented with a truncated version, that is, using a fixed window size traceback instead of full frame length traceback. In this embodiment, the whole frame is partitioned into small blocks of the traceback window size. A normal block is decoded based on two blocks (the current and the next) of path metric computation and the traceback. The traceback is done from a maximum path metric state except for the last two blocks. The last two blocks are decoded by tracing back from zero state at once (decoder flushing).

The BTFD_PSC performs the CRC test, threshold calculations and comparisons and sets hard decision bits for BTFD. Then the BTFD_PSC determines the location of the BTFD point with respect to the frame while the hard decision bits are stored in a buffer. In one embodiment of the invention, the BTFD may be an integral part of the Viterbi decoder. For traceback memory saving, the Viterbi decoder can be implemented with a truncated version, that is, using a fixed window size traceback instead of full frame length traceback. In this embodiment, the whole frame is partitioned into small blocks of the traceback window size. A normal block is decoded based on two blocks (the current and the next) of path metric computation and the traceback. The traceback is done from a maximum path metric state except for the last two blocks. The last two blocks are decoded by tracing back from zero state at once (decoder flushing).

In one embodiment of the present invention, there are three possibilities for the position of each BTFD checkpoint: the BTFD checkpoint is positioned (1) at a traceback point, (2) within a traceback window or (3) at an end of the frame. The following presents a one-pass zero state traceback solution that corresponds to the three positions set forth above.

Suppose the frame size is L, the traceback length is TrL and the decoded portion after each traceback is DecL. In this embodiment, TrL=DecL. For BTFD checkpoint $n_{end}$, three alternatives exist: $n_{end}$=k*TrL, $n_{end}$=k*TrL+M or $n_{end}$=L for some integer k and M>0. As BTFD may traceback from different states as compared to normal truncated Viterbi decoding, hardware context switch and path metric computation rollback is needed. Proper resource management in the Viterbi decoder is important in implementing these BTFD schemes. An extra buffer BTFD_temp of size 2*TrL bits is included to store the hard decision bits that come out of the zero state traceback. A temporary buffer DEC_temp of TrL bits is also included to store some decoder output.

For the first case, with $n_{end}$=k*TrL, sub-algorithm I, as shown in TABLE 1, is used.

TABLE 1

Sub-algorithm I (1) Trace back from the state with maximum path metric at timing moment $n_{end}$ to decode the portion with time index [(k − 2)*TrL, (k − 1)*TrL]. This is normal Viterbi decoder operation. Buffer the hard decision bits into DEC_temp.
(2) Check threshold: Is Threshold($n_{end}$) >= 0?
(3) If threshold check passes, flush decoder from zero state and decode hard decision bits with time index [(k − 2)*TrL, k*TrL]. Note that portion [(k − 2)*TrL, (k − 1)*TrL] gets re-decoded. If threshold check does not pass, go to step (5).
(4) Calculate and check CRC. If CRC passes, compare Threshold($n_{end}$) with Threshold($n_{win}$). If Threshold($n_{end}$) >= Threshold($n_{win}$), then update $n_{win}$ = $n_{end}$, Threshold ($n_{win}$) = Threshold($n_{end}$) and buffer the hard decision bits into BTFD_temp.

TABLE 1-continued

Sub-algorithm I (5) Copy the hard decision bits from DEC_temp into decoder output buffer to replace the corresponding portion with time index [(k − 2)*TrL, (k − 1)*TrL]. Continue the Viterbi decoder operation to decode the portion with time index [(k − 1)*TrL, k*TrL] again (traceback from state with maximum path metric at time moment (k + 1)*TrL later).

For the second case, with $n_{end}$=k*TrL +M, sub-algorithm II, as shown in TABLE 2, is used.

TABLE 2

Sub-algorithm II (1) Trace back from the state with maximum path metric at timing moment (k + 1)*TrL to decode the portion with time index [(k − 1)*TrL, k*TrL]. Buffer the hard decision bits into DEC_temp.
(2) Check threshold: Is Threshold($n_{end}$) >= 0?
(3) If threshold check passes, flush decoder from zero state and decode hard decision bits with time index [(k − 1)*TrL, $n_{end}$]. Note that portion [(k − 1)*TrL, k*TrL] gets re-decoded. If threshold check does not pass, go to step (5).
(4) Calculate and check CRC. If CRC passes, compare Threshold($n_{end}$) with Threshold($n_{win}$). If Threshold($n_{end}$) >= Threshold($n_{win}$), then update $n_{win}$ = $n_{end}$, Threshold($n_{win}$) = Threshold($n_{end}$) and buffer the hard decision bits into BTFD_temp.
(5) Copy the hard decision bits from DEC_temp into decoder output buffer to replace the corresponding portion with time index [(k − 1)*TrL, k*TrL]. Continue the Viterbi decoder operation to decode the portion with time index [k*TrL, (k + 1)*TrL] again (traceback from state with maximum path metric at time moment (k + 2)*TrL later).

The third BTFD case, $n_{end}$=L+NumTailBits, is straightforward in traceback, CRC check and path metrics examination. The normal decoding operation, sub-algorithm III, as shown in TABLE 3, is used.

TABLE 3

Sub-algorithm III (1) Flush decoder from zero state and decode hard decision bits with time index [(k − 1)*TrL, $n_{end}$]. Note that no temporary buffer is needed in this case.
(2) Check threshold: Is Threshold($n_{end}$) >= 0?
(3) If threshold check passes, calculate and check CRC. If CRC passes, compare Threshold($n_{end}$) with Threshold($n_{win}$). If Threshold($n_{end}$) >= Threshold($n_{win}$), then update $n_{win}$ = $n_{end}$ and Threshold($n_{win}$) = Threshold($n_{end}$). If CRC does not pass, do nothing. Decoding and BTFD finished.

An exemplary, full, one-pass, zero-state traceback BTFD algorithm is shown in TABLE 4. In one embodiment of the invention, the third step of the one-pass BTFD algorithm can be implemented in hardware as an integral part of the Viterbi decoder with BTFD. In another embodiment of the invention, DSP may be used to perform the data I/O operations.

TABLE 4

One-pass BTFD algorithm

Step(1): Initialize $n_{win}$ = NULL and Threshold ($n_{win}$) = 0.
Step(2): For each BTFD checkpoint $n_{end}$ {
    If $n_{end}$ = k*TrL and $n_{end}$ < L+NumTailBits {
        Execute Sub-algorithm I;
    } else if $n_{end}$ = k*TrL and $n_{end}$ <L+NumTailBits {

TABLE 4-continued

One-pass BTFD algorithm

Execute Sub-algorithm II;
    } else if $n_{end}$ = L+NumTailBits {
        Execute Sub-algorithm III;
    }
}
Step (3): If($n_{win}$ != NULL) {
    Declare $n_{win}$;
    If($n_{win}$ < L+NumTailBits) {
        Read out hard bits stored in BTFD_temp for Sub-algorithm I and II;
        Overwrite the corresponding portion of the Decoder output buffer;
    }
} else {
    Declare a bad frame;
}

Figure 6:
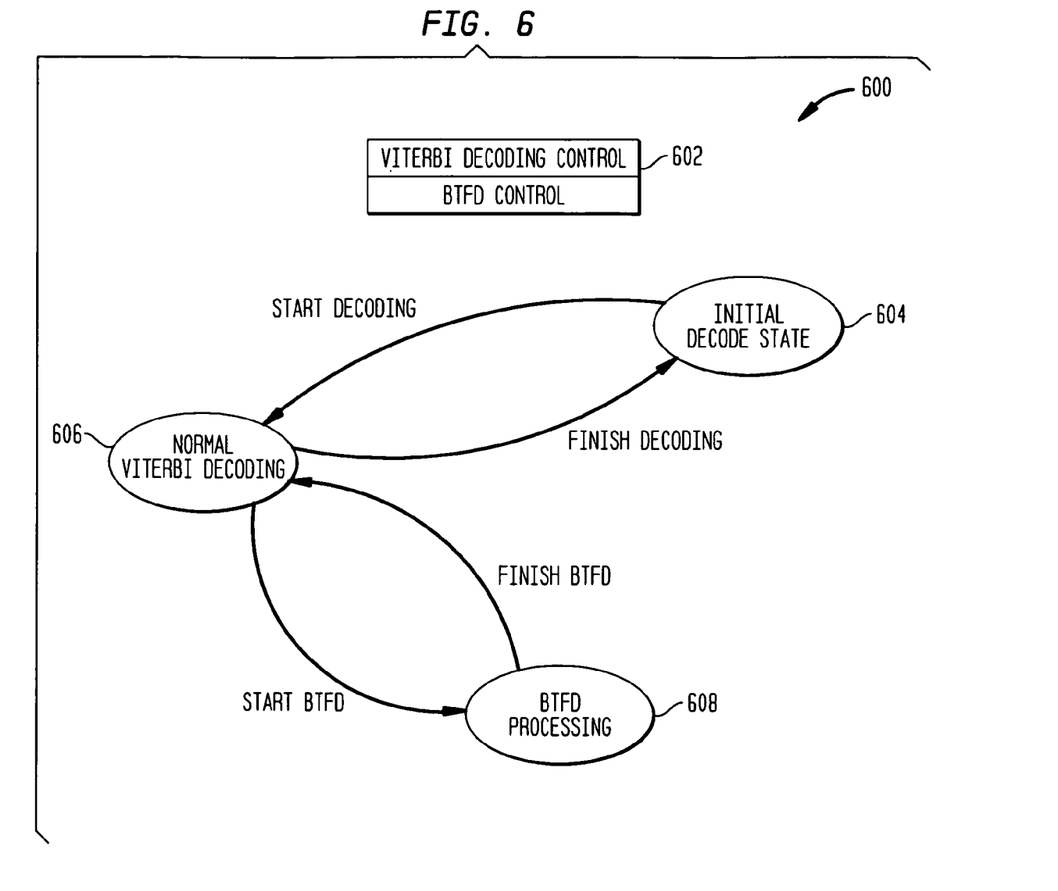
FIG. 6 illustrates an embodiment of a BTFD control state machine constructed in accordance with the principles of the present invention.

Turning now to FIG. 6, illustrated is an embodiment of a BTFD control state machine, generally designated 600, constructed in accordance with the principles of the invention. BTFD is performed in parallel with Viterbi decoding, thereby significantly decreasing the time and effort required to perform BTFD. This not only allows BTFD to be performed with respect to high rate channels, but also allows BTFD to be performed on channels of any rate more power-efficiently.

The Viterbi decoding control and BTFD control 602 directs the BTFD control state machine to move from the initial decode state 604 and to start decoding the incoming frames, thus initiating normal Viterbi decoding in state 606. The Viterbi decoder runs to the first checkpoint, then starts BTFD, moving to state 608: BTFD processing. When the BTFD processing is finished, the state 606 is resumed and the next checkpoint decoded. Then, state 608 is resumed for BTFD processing. The Viterbi decoding and BTFD processing continue until the final checkpoint is reached and decoding is finished. Then, the state returns to the initial decode state 604.

Figure 7:
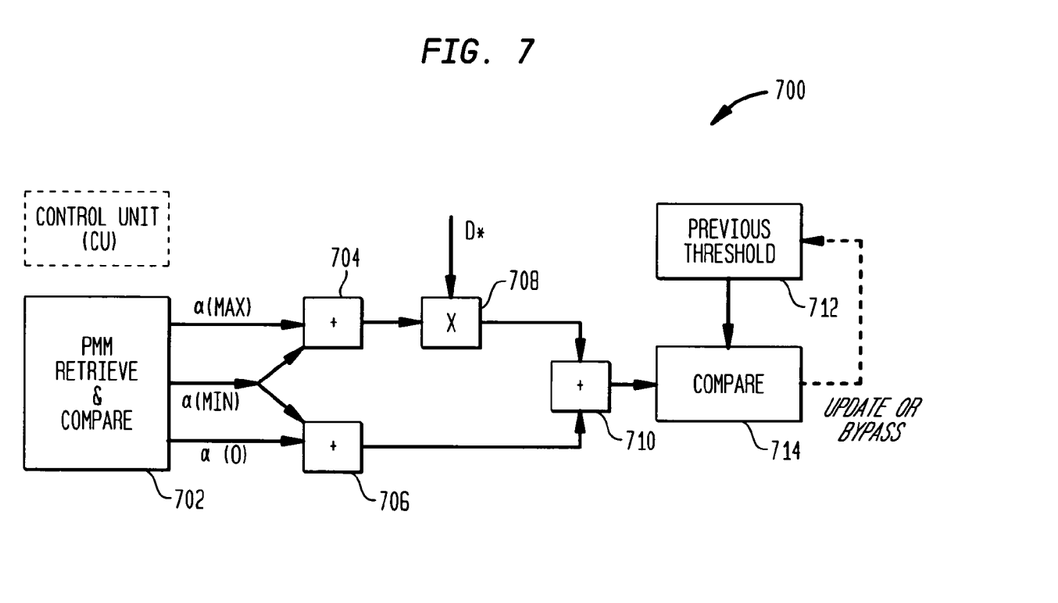
FIG. 7 illustrates a functional block diagram for BTFD threshold computation and comparison constructed in accordance with the principles of the present invention.

Turning now to FIG. 7, illustrated is a functional block diagram for BTFD threshold computation and comparison, generally designated 700, constructed in accordance with the principles of the present invention. The main function of 700 is to calculate the threshold and compare to previous thresholds. As indicated in the previous discussions, the threshold check is as follows:

Threshold($n_{end}$)=D*{$a_{max}(n_{end})-a_{min}(n_{end})$}−{$a_0 (n_{end})-a_{min}(n_{end})$}≧0

Included in 700 is a PMM retrieve and compare block 702, three adders 704, 706, 710, a multiplier 708, a comparator 714 and a memory block 712. The adder 704 receives the two inputs α(max) and −α(min), performs an addition and passes the output α(max)−α(min) to multiplier 708. The multiplier 708 multiplies this input by D*, producing the output: D*{α(max)−α(min)}. This output is an input to adder 710. The adder 706 receives inputs α(0) and −α(min), performs an addition and passes the output α(0)−α(min) to an inverter and then to the adder 710 . The adder 710 adds its two inputs to produce the following output: D*{α(max)−α(min)}−{α(0)−α(min)}. This output is the threshold to test. The comparator 714 tests whether the threshold is greater than zero, and also compares the current threshold to the previous threshold 712. Depending on the result of the comparison, the points are either updated or bypassed. If the current threshold is greater than the previous threshold, then update the $n_{win}$ point and previous threshold with the current point and threshold.

Figure 8:
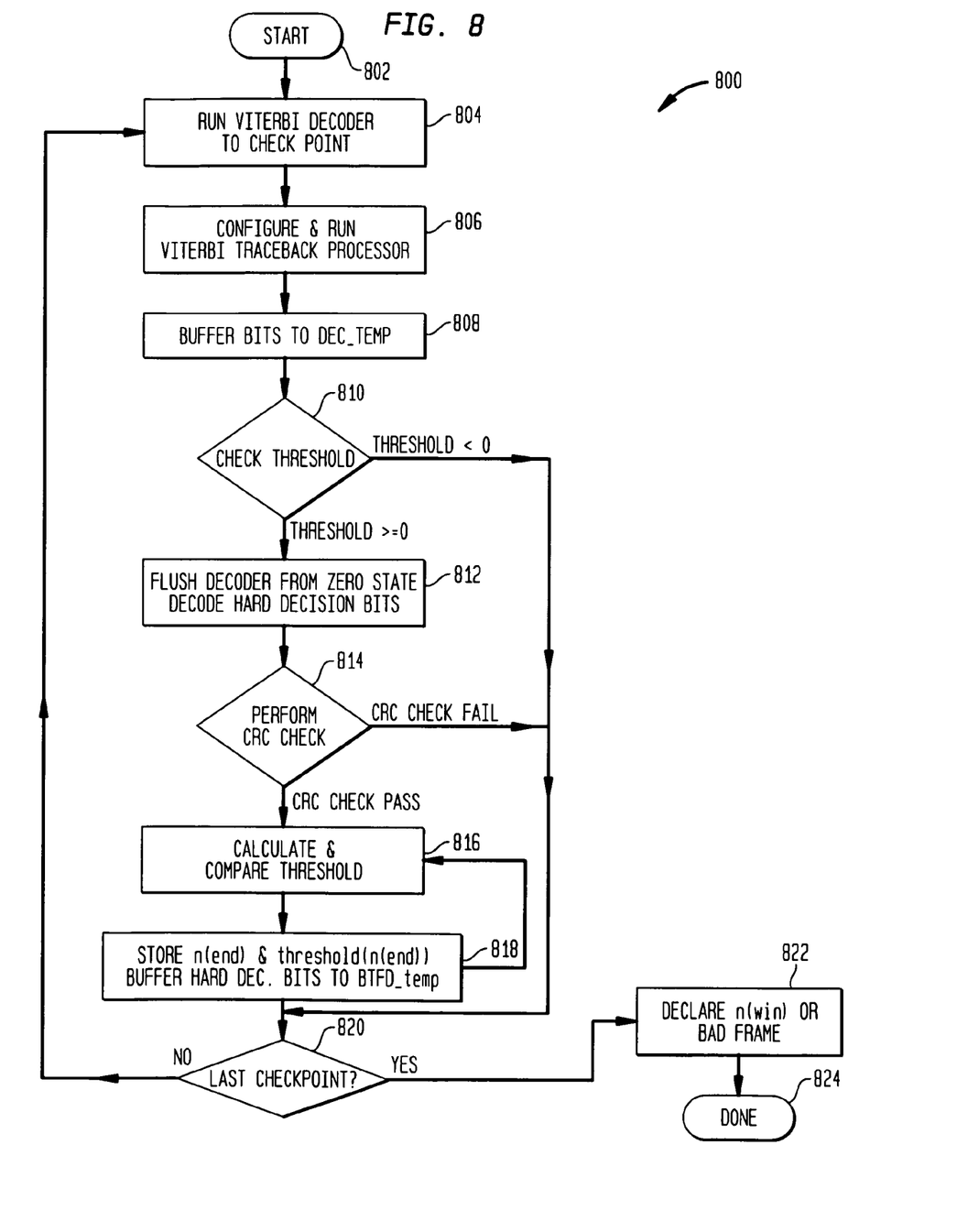
FIG. 8 illustrates a flow diagram of an embodiment of a method of performing the one-pass BTFD.

Turning now to FIG. 8, illustrated is a flow diagram of an embodiment of a method of performing the one-pass BTFD, generally designated 800, constructed in accordance with the principles of the present invention.

The method 800 starts in step 802 with an intent to decode the received frames using one-pass BTFD. In the first operational step 804, the Viterbi decoder is run to the first checkpoint. Whole frames of data are transferred into the decoder input buffer. Then in step 806, the VTP is configured with constraint length, code rate, CRC format and the first checkpoint. Then, the VTP is run to the first BTFD checkpoint. Next, in step 808, hard decision bits are temporarily stored in the DEC_temp register.

In a first decisional step 810, the current threshold is checked. If a sufficient threshold is ascertained in the first decisional step 810, the method 800 proceeds to step 812. In an exemplary embodiment, a sufficient threshold is non-negative. In the step 812, the decoder is flushed from the zero state, and hard decision bits are decoded.

Next, the method 800 proceeds to the second decisional step 814, in which the CRC test is performed. If the CRC test passes, the method 800 proceeds to step 816. In step 816, the current threshold, $Threshold(n_{end})$, is calculated and compared to the previous stored threshold, $Threshold(n_{win})$.

In step 818, if the current threshold, $Threshold(n_{end})$, is greater than or equal to previous threshold, $Threshold(n_{win})$, then endpoints and thresholds are updated. That is, $n_{end}$ and $Threshold(n_{end})$ are stored in $n_{win}$ and $Threshold(n_{win})$ respectively. The hard decision bits are also buffered in BFTD_temp. The method 800 then proceeds to a third decisional step 820.

If a decision was made in the first decisional step 810 that the threshold was not sufficient, or if the CRC test performed in the second decisional step 814 failed, then the method 800 proceeds to the third decisional step 820.

In the third decisional step 820, the method 800 determines whether the last BTFD checkpoint has been processed. If it is not the last BTFD checkpoint, the method 800 returns to step 804. If the last BTFD checkpoint has been processed, the method 800 proceeds to step 822. In step 822, $n_{win}$ or a bad frame is declared. The method 800 ends in step 824.

Although the present invention has been described in detail, those skilled in the art should understand that they can make various changes, substitutions and alterations herein without departing from the spirit and scope of the invention in its broadest form.

What is claimed is:

1. For use in a CDMA receiver having a Viterbi decoder, a system for performing one-pass blind transport format detection (BTFD) with respect to received frames, comprising:
 a traceback circuit that performs a zero state BTFD traceback function with respect to at least a Viterbi-decoded portion of each of said received frames, said traceback function being dependent upon a relative position of a BTFD checkpoint and generates hard decision bits; and
 a BTFD point selection circuit, coupled to said traceback circuit, that employs said hard decision bits to determine a location of a BTFD point with respect to said each of said received frames, thereby performing BTFD unconditionally in a single pass in said each of said received frames.

2. The system as recited in claim 1 wherein said BTFD checkpoint is positioned:
 at a traceback point,
 within a traceback window, or
 at an end of one of said received frames.

3. The system as recited in claim 1 wherein said traceback circuit performs said zero state BTFD traceback function with respect to a Viterbi-decoded portion of one of said received frames.

4. The system as recited in claim 1 wherein said BTFD point selection circuit determines said BTFD point to be a BTFD checkpoint having a maximum threshold.

5. The system as recited in claim 1 wherein said traceback circuit performs said traceback function while said at least Viterbi-decoded portion of each of said received frames is stored in a buffer.

6. The system as recited in claim 1 wherein said BTFD point selection circuit determines said location of said BTFD point with respect to said each of said received frames while said hard decision bits are stored in a buffer.

7. The system as recited in claim 1 wherein said traceback circuit and said BTFD point selection circuit are integral to said Viterbi decoder.

8. For use in a CDMA receiver having a Viterbi decoder, a method of performing one-pass blind transport format detection (BTFD) with respect to a received frame, comprising:
 performing a zero state BTFD traceback function with respect to at least a Viterbi-decoded portion of said received frame, said traceback function being dependent upon a relative position of a BTFD checkpoint and generating hard decision bits; and
 employing said hard decision bits to determine a location of a BTFD point with respect to said received frame, thereby unconditionally performing BTFD in a single pass of said received frame.

9. The method as recited in claim 8 wherein said BTFD checkpoint is positioned:
 at a traceback point,
 within a traceback window, or
 at an end of said received frame.

10. The method as recited in claim 8 wherein said at least said Viterbi-decoded portion is two blocks of said received frame.

11. The method as recited in claim 8 wherein said employing comprises determining said BTFD point to be a BTFD checkpoint having a maximum threshold.

12. The method as recited in claim 8 wherein said performing comprises performing said traceback function while said at least Viterbi-decoded portion of said received frame is stored in a buffer.

13. The method as recited in claim 8 wherein said employing comprises determining said location of said BTFD point with respect to said received frame while said hard decision bits are stored in a buffer.

14. The method as recited in claim 8 wherein at least a portion of said performing or said employing is carried out within said Viterbi decoder in a single pass of said received frame.

15. A WCDMA receiver, comprising:
 an antenna for receiving a transmission having a sequence of WCDMA symbols;
 a demodulator, coupled to said antenna, for removing a carrier frequency from said transmission;
 a Viterbi decoder, coupled to said demodulator, for decoding said sequence of WCDMA symbols into frames;
 a traceback circuit, associated with said Viterbi decoder, that performs a zero state blind transport format detection (BTFD) traceback function with respect to at least a Viterbi-decoded portion of each of said received frames, said traceback function being dependent upon a relative position of a BTFD checkpoint and generating hard decision bits;

a BTFD point selection circuit, associated with said Viterbi decoder, that employs said hard decision bits to determine a location of a BTFD point with respect to said each of said received frames;

a transport decode circuit, coupled to said BTFD point selection circuit, that employs said BTFD point to extract user bits from each of said received frames, thereby performing unconditionally BTFD in a single pass in said each of said received frames; and digital-to-analog conversion circuitry, coupled to said transport decode circuit, that converts said bits into an analog signal for reproduction to a receiving party.

16. The receiver as recited in claim 15 wherein said BTFD checkpoint is positioned:
    at a traceback point,
    within a traceback window, or
    at an end of one of said received frames.

17. The receiver as recited in claim 15 wherein said at least said Viterbi-decoded portion is two blocks of one of said received frames.

18. The receiver as recited in claim 15 wherein said BTFD point selection circuit determines said BTFD point to be a BTFD checkpoint having a maximum threshold.

19. The receiver as recited in claim 15 wherein said traceback circuit performs said traceback function while said at least said Viterbi-decoded portion of each of said received frames is stored in a buffer.

20. The receiver as recited in claim 15 wherein said BTFD point selection circuit determines said location of said BTFD point with respect to said each of said received frames while said hard decision bits are stored in a buffer.

21. The receiver as recited in claim 15 wherein said traceback circuit and said BTFD point selection circuit are integral to said Viterbi decoder.

* * * * *